(12) United States Patent
Lee et al.

(10) Patent No.: US 10,563,997 B2
(45) Date of Patent: Feb. 18, 2020

(54) MULTISENSORY INTERFACE CONTROL METHOD, MULTISENSORY INTERFACE CONTROL APPARATUS, AND MULTISENSORY INTERFACE SYSTEM

(71) Applicant: DENSO CORPORATION, Kariya, Aichi-pref. (JP)

(72) Inventors: Ryo Kyung Lee, Kariya (JP); Keisuke Hachisuka, Kariya (JP); Eiichi Okuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 14 days.

(21) Appl. No.: 15/520,324

(22) PCT Filed: Oct. 12, 2015

(86) PCT No.: PCT/JP2015/005160
§ 371 (c)(1),
(2) Date: Apr. 19, 2017

(87) PCT Pub. No.: WO2016/063488
PCT Pub. Date: Apr. 28, 2016

(65) Prior Publication Data
US 2017/0314951 A1   Nov. 2, 2017

(30) Foreign Application Priority Data
Oct. 23, 2014   (JP) .................................. 2014-216426

(51) Int. Cl.
*G01C 21/36*   (2006.01)
*G06F 17/28*   (2006.01)
(Continued)

(52) U.S. Cl.
CPC ............... *G01C 21/36* (2013.01); *G06F 3/01* (2013.01); *G06F 3/011* (2013.01); *G06F 3/0487* (2013.01);
(Continued)

(58) Field of Classification Search
None
See application file for complete search history.

(56) References Cited

U.S. PATENT DOCUMENTS 4,359,713 A * 11/1982 Tsunoda .................... G07C 5/00
340/521
5,841,439 A * 11/1998 Pose ....................... G06T 15/005
345/418
(Continued)

FOREIGN PATENT DOCUMENTS

JP   WO 2007105694 A1 *  9/2007 ............ A61M 21/00
WO   2007/105694 A1      9/2007

OTHER PUBLICATIONS

"Sensorimotor modulation of mood and depression: Ab\n untegrative review" written by R. Canbeyli, Behavioural Brain Research 207 (2010) 249-264.
(Continued)

*Primary Examiner* — Patrick N Edouard
*Assistant Examiner* — Peijie Shen
(74) *Attorney, Agent, or Firm* — Knobbe, Martens, Olson & Bear, LLP

(57) ABSTRACT

A multisensory interface control method for a multisensory interface that includes a plurality of information transmission channels, each of which performing information transmission by utilizing one or a plurality of five senses is provided. The multisensory interface control method includes: estimating a user status indicating at least one of an emotional status and an attentional status of a user; setting
(Continued)

weightings each of which indicates a degree of importance of a corresponding information transmission channel in accordance with the user status estimated; and changing allocations of a plurality of sets of partial content that configure content transmitted via the multisensory interface, the allocations changed in accordance with the weightings.

9 Claims, 16 Drawing Sheets

(51) Int. Cl.

| | |
|---|---|
| G06F 3/147 | (2006.01) |
| G06F 3/01 | (2006.01) |
| G09B 7/02 | (2006.01) |
| G06F 3/0487 | (2013.01) |
| G09B 3/04 | (2006.01) |
| G02B 27/01 | (2006.01) |

(52) U.S. Cl.
CPC ............ *G06F 3/147* (2013.01); *G06F 17/289* (2013.01); *G09B 3/045* (2013.01); *G09B 7/02* (2013.01); *G02B 27/017* (2013.01); *G02B 2027/014* (2013.01); *G02B 2027/0112* (2013.01); *G02B 2027/0141* (2013.01)

(56) References Cited

U.S. PATENT DOCUMENTS

| | | | | |
|---|---|---|---|---|
| 6,208,932 | B1* | 3/2001 | Ohmura | G08G 1/0962 |
| | | | | 701/538 |
| 6,964,023 | B2 | 11/2005 | Maes et al. | |
| 7,003,285 | B2 | 2/2006 | Carter | |
| 8,594,838 | B2 | 11/2013 | Selker et al. | |
| 2005/0086610 | A1* | 4/2005 | Mackinlay | G06F 3/011 |
| | | | | 715/817 |
| 2006/0139312 | A1* | 6/2006 | Sinclair, II | G06F 3/0481 |
| | | | | 345/156 |
| 2006/0235753 | A1* | 10/2006 | Kameyama | B60H 1/00742 |
| | | | | 705/15 |
| 2007/0050191 | A1 | 3/2007 | Weider et al. | |
| 2007/0192038 | A1* | 8/2007 | Kameyama | G01C 21/3641 |
| | | | | 702/19 |
| 2008/0119994 | A1* | 5/2008 | Kameyama | B60W 40/08 |
| | | | | 701/48 |
| 2008/0239139 | A1* | 10/2008 | Choi | H04N 5/23212 |
| | | | | 348/345 |
| 2008/0255850 | A1 | 10/2008 | Cross et al. | |
| 2009/0030619 | A1* | 1/2009 | Kameyama | G06F 16/636 |
| | | | | 702/19 |
| 2009/0076637 | A1* | 3/2009 | Kameyama | G06F 16/636 |
| | | | | 700/94 |
| 2010/0164956 | A1* | 7/2010 | Hyndman | G06F 3/011 |
| | | | | 345/427 |
| 2010/0295670 | A1* | 11/2010 | Sato | B60Q 9/00 |
| | | | | 340/458 |
| 2011/0202396 | A1* | 8/2011 | Viveiros | E04H 3/02 |
| | | | | 705/14.4 |
| 2011/0231182 | A1 | 9/2011 | Weider et al. | |
| 2012/0167035 | A1* | 6/2012 | Han | G06F 8/20 |
| | | | | 717/104 |
| 2012/0178065 | A1* | 7/2012 | Naghavi | G16H 20/60 |
| | | | | 434/236 |
| 2012/0278073 | A1 | 11/2012 | Weider et al. | |
| 2013/0169690 | A1* | 7/2013 | Gotou | B60R 1/00 |
| | | | | 345/660 |
| 2013/0195204 | A1* | 8/2013 | Reznik | H04N 19/85 |
| | | | | 375/240.26 |
| 2013/0219012 | A1* | 8/2013 | Suresh | G09G 5/14 |
| | | | | 709/217 |
| 2013/0253929 | A1 | 9/2013 | Weider et al. | |
| 2013/0283162 | A1 | 10/2013 | Aronsson et al. | |
| 2014/0020003 | A1* | 1/2014 | Alshinnawi | H04N 21/236 |
| | | | | 725/12 |
| 2014/0112556 | A1 | 4/2014 | Kalinli-Akbacak | |
| 2014/0125558 | A1 | 5/2014 | Miyajima et al. | |
| 2015/0004576 | A1* | 1/2015 | Yoon | A61B 5/7264 |
| | | | | 434/236 |
| 2015/0110287 | A1* | 4/2015 | Holdren | B60R 11/0247 |
| | | | | 381/86 |
| 2015/0264299 | A1* | 9/2015 | Leech | H04N 19/137 |
| | | | | 348/78 |
| 2016/0054565 | A1* | 2/2016 | Izumihara | G09G 5/00 |
| | | | | 345/8 |
| 2016/0086378 | A1* | 3/2016 | Shuster | G06F 3/013 |
| | | | | 345/633 |
| 2016/0205238 | A1* | 7/2016 | Abramson | G01C 21/3484 |
| | | | | 455/456.4 |
| 2017/0172521 | A1* | 6/2017 | Sudo | A61B 5/0205 |

OTHER PUBLICATIONS

"Sadness Increases Distraction by Auditory Deviant Stimuli" written by Antonia Pilar Pacheco-Unguetti et al. ResearchGate, Aug. 19, 2015.
"Emotion Drives Attention: Detecting the Snake in the Grass" written by Arne Ohman et al., Journal of Experimental Psychology:General 2001 vol. 130 No. 3, 466-478.
"The Effect of Emotion and Personality on Olfactory Perception" written by Danise Chen et al. Chemical Senses Advance Access published Mar. 23, 2005.
"Anxiety and deficient inhibition of threat distractors: Spatial attention span and time course" written by Manuel G. Calvo et al., Journal of Cognitive Psychology, 2012, 24(1), 66-78.
"The Effect of Emotion on Cue Utilization and the Organization of Behavior" written by J.A. Easterbrook, Psychological Review vol. 66, No. 3, 1959.

* cited by examiner

FIG. 2A

| USER STATUS | WEIGHTING | | | | |
|---|---|---|---|---|---|
| | CH1 | CH2 | CH3 | ... | CHn |
| S1 (DEFAULT) | G11 | G12 | G13 | ... | G1n |
| S2 | G21 | G22 | G23 | ... | G2n |
| ⋮ | | | ⋮ | | |
| Sm | Gm1 | Gm2 | Gm3 | ... | Gmn |

FIG. 2B

[CONTENT X(I1, I2, I3···Ix)]
CH1 (SIGHT USE INFORMATION TRANSMISSION CHANNEL)

| WEIGHTING $G_{ij}$ (RANGE) | CONTENT ADJUSTMENT DETAILS | |
|---|---|---|
| | ALLOCATION | MODE |
| 0 | − | − |
| $0 < G_{ij} \leq 0.5$ | PARTIAL CONTENT (I1) | SIZE(0.5), POSITION(Ps), COLOR(N) |
| $0.5 < G_{ij} \leq 1$ | PARTIAL CONTENT (I1) | SIZE(1), POSITION(Pc), COLOR(N) |
| $1 < G_{ij} \leq 1.5$ | PARTIAL CONTENT (I1, I2) | SIZE(1.5), POSITION(Pc), COLOR(N) |
| $1.5 < G_{ij} \leq 2$ | PARTIAL CONTENT (I1, I2) | SIZE(1.5), POSITION(Pc), COLOR(C) |

CH2 (HEARING USE INFORMATION TRANSMISSION CHANNEL)

| WEIGHTING $G_{ij}$ (RANGE) | CONTENT ADJUSTMENT DETAILS | |
|---|---|---|
| | ALLOCATION | MODE |
| 0 | − | − |
| $0 < G_{ij} \leq 0.5$ | PARTIAL CONTENT (I2) | VOLUME(0.5), SOUND IMAGE LOCALIZATION(Ps), TONE(N) |
| $0.5 < G_{ij} \leq 1$ | PARTIAL CONTENT (I2) | VOLUME(1), SOUND IMAGE LOCALIZATION(Pc), TONE(N) |
| $1 < G_{ij} \leq 1.5$ | PARTIAL CONTENT (I2, I3) | VOLUME(1.5), SOUND IMAGE LOCALIZATION(Pc), TONE(N) |
| $1.5 < G_{ij} \leq 2$ | PARTIAL CONTENT (I2, I3) | VOLUME(2), SOUND IMAGE LOCALIZATION(Pc), TONE(C) |

MULTISENSORY INTERFACE CONTROL METHOD, MULTISENSORY INTERFACE CONTROL APPARATUS, AND MULTISENSORY INTERFACE SYSTEM

CROSS-REFERENCE TO RELATED APPLICATIONS

The present application is based on Japanese Patent Application No. 2014-216426 filed on Oct. 23, 2014, the disclosures of which is incorporated herein by reference.

TECHNICAL FIELD

The present disclosure relates to a technology controlling a multisensory interface.

BACKGROUND ART

There has been known in recent years a human-machine interface (HMI) or a human-computer interface (HCI) that performs multisensory information transmission by utilizing human five senses (such as eyesight, touch, and hearing).

For example, an interface configured by both a map-based display showing a current position and a route display, and a voice route guidance has been realized as a unified interface device utilizing eyesight and hearing in a navigation system for a vehicle.

There has been also known a technology capable of selecting or changing content to be provided to a user in accordance with a status of the user, as well as realizing only multisensory information transmission (referring to Patent Literature 1).

PRIOR ART LITERATURE

Patent Literature

Patent Literature 1: US2014/0125558 A1

SUMMARY OF INVENTION

Various studies in the field of cognitive psychology and cognitive science show that all processes performed by a human for receiving and unifying various senses (five senses) are affected by an emotion of the human.

For example, the followings have been currently proven. Depression lowers sensitivities of eyesight, hearing, and smell (R. Canbeyli (2010). Sensorimotor modulation of mood and depression: An integrative review. Behavioural Brain Research 207 (2010): 249-264.). Sadness increases hearing noise distraction to a process performed by a subject during an auditory-visual oddball task for hearing and eyesight (A. Pacheco-Unguetti & F. Parmentier (2014). Sadness Increases Distraction by Auditory Deviant Stimuli. Emotion 14 (1): 203-213.). Attention itself as a basis for feeling, perception, and cognition is controlled by senses (A. Ohman, A. Flykt & F. Esteves (2001). Emotion drives attention: Detecting the snake in the grass. Journal of Experimental Psychology: General 130 (3): 466-478; D. Chen & P Dalton (2005). The Effect of Emotion and Personality on Olfactory Perception. Chemical Senses 30 (4): 345-351; J Easterbrook (1959). The effect of emotion on cue utilization and the organization of behavior. Psychological Review 66 (3): 183-201; M Calvo, A Gutierrez & A Fernandez-Martin (2012). Anxiety and deficient inhibition of threat distractors: Spatial attention span and time course. Journal of Cognitive Psychology 24 (1): 66-78).

According to conventional technologies, however, information to be provided is distributed beforehand to multiple information transmission channels configuring a multisensory interface. A distribution ratio is kept constant even when a situation changes. In this case, there may be produced a lost part in the entire information desired to be transmitted to the user when the information transmission channel to which the corresponding part has been allocated comes into a state difficult to transmit information.

It is an object of the present disclosure to provide a technology capable of preventing an unnecessary loss of information, and realizing efficient information transmission in a multisensory interface.

A multisensory interface control method for a multisensory interface according to a first example of the present disclosure includes multiple information transmission channels, each of which performing information transmission by utilizing one or multiple of five senses. The multisensory interface control method includes: estimating a user status indicating at least one of an emotional status and an attentional status of a user; setting weightings each of which indicates a degree of importance of a corresponding information transmission channel in accordance with the user status estimated; and changing allocations of a plurality of sets of partial content that configure content transmitted via the multisensory interface, the allocations changed in accordance with the weightings.

A multisensory interface control apparatus according to a second example of the present disclosure controls a multisensory interface that includes multiple information transmission channels, each of which performing information transmission by utilizing one or multiple of five senses. The multisensory interface control apparatus including: a user status estimation portion that estimates a user status indicating at least one of an emotional status and an attentional status of a user; a weighting setting portion that sets weightings each of which indicates a degree of importance of a corresponding information transmission channel in accordance with the user status estimated by the user status estimation portion; and a content adjustment portion that changes allocations of a plurality of sets of partial content that configure content transmitted via the multisensory interface, the allocations changed in accordance with the weightings.

Further, a multisensory interface system according to a third example of the present disclosure includes the multisensory interface and the multisensory interface control apparatus According to the disclosure described above, the information transmission channels to which a high degree of importance is given are switched in accordance with the user status. In this case, the allocations of respective sets of the partial content to the information transmission channels are appropriately changed in accordance with the weightings indicating degrees of importance. Accordingly, an unnecessary loss of information is prevented, and efficient information transmission is realizable.

BRIEF DESCRIPTION OF DRAWINGS

The above and other aspects, features and advantages of the present disclosure will become more apparent from the following detailed description made with reference to the accompanying drawings. In the drawings:

FIG. 2A is an explanatory view illustrating an outline of adjustment information, as an explanatory view showing an example of weightings;

FIG. 2B is an explanatory view illustrating the outline of the adjustment information, as an explanatory view showing a relationship example between the weightings and content;

DESCRIPTION OF EMBODIMENTS

An embodiment to which the present disclosure is applied is hereinafter described with reference to the drawings.

Configuration

Figure 1:
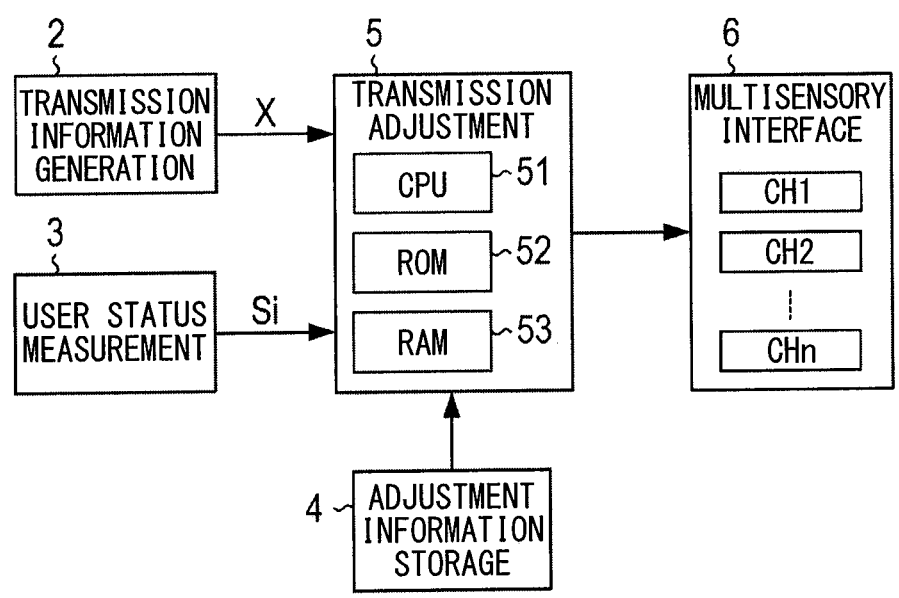
FIG. 1 is a block diagram illustrating a configuration of a multisensory interface system.

As illustrated in FIG. 1, a multisensory interface system 1 includes a transmission information generation portion 2, a user status measurement portion 3, an adjustment information storage portion 4, a transmission adjustment portion 5, and a multisensory interface 6.

The multisensory interface 6 includes multiple information transmission channels CH1, CH2, and up to CHn (n: positive integer) each of which transmits information by utilizing one or multiple senses included in human five senses (eyesight, hearing, touch, smell, and taste). For example, the information transmission channel utilizing eyesight is configured by a display device, an illumination device or the like, the information transmission channel utilizing hearing is configured by an acoustic device or the like, the information transmission channel utilizing touch is configured by a vibration generation device, a heat generation device, a cooling device or the like, and the information transmission channel utilizing smell or taste is configured by a device generating smell, a device stimulating taste or the like. Note that there may be provided an information transmission channel configured by two or more types of channels utilizing different senses, or may be provided multiple channels utilizing the same sense. Information transmission in this context refers to all types of interactions between a user and a device, regardless of the purpose of interface.

The transmission information generation portion 2 generates information (content X) to be transmitted to the user by using the multisensory interface 6. In case of a configuration applied to a vehicle, for example, the transmission information generation portion 2 generates information necessary for providing various types of driving assistance based on information obtained from various types of sensors provided on the vehicle. In case of a configuration applied to a device for assisting a certain operation, the transmission information generation portion 2 generates information based on information obtained from various types of sensors detecting a degree of progression of the operation. Note that each set of the content X is configured by multiple sets of partial content I1, I2, and up to Ix (x: positive integer).

The user status measurement portion 3 measures a status of the user. More specifically, the user status measurement portion 3 includes a camera for imaging actions and expressions of the user, various types of measurement devices for measuring biosignals of the user, a microphone acquiring voices generated from the user, and others. Note that these detection results are used to estimate user statuses S1, S2, and up to Sm (m: positive integer) each of which indicates an emotional state of the user (such as anger, laughter, fear, pleasure, and sadness), and an attentional status (such as concentration and distraction).

The adjustment information storage portion 4 stores adjustment information used for processing performed by the transmission adjustment portion 5. The adjustment information is configured by a weighting table and a content adjustment table.

As illustrated in FIG. 2A, the weighting table shows numerical values of weightings Gi1 through Gin indicating the degrees of importance of the respective information transmission channels CH1 through CHn for each of user statuses Si (i=1 to m) estimated based on the measurement result measured by the user status measurement portion 3. The respective weightings Gi1 through Gin indicating the degrees of importance of the respective information transmission channels CH1 through CHn in the corresponding user status are correlated with the corresponding user status in the table. It is assumed herein that the user status S1 is a default user status. The default user status generally indicates neutral emotional and attentional statuses. However, the default user status may indicate other emotional and attentional statuses. On the other hand, the content adjustment table illustrated in FIG. 2B is set for each of types of the content X to be transmitted, and for each of the information transmission channels CHj (j=1 to n), and correlates a weighting Gij (or range of weighting Gij) and corresponding content adjustment details. Note that the weighting Gij of zero indicates that the corresponding information transmission channel is not used.

The content adjustment details are configured by allocation information indicating partial content to be transmitted via the corresponding information transmission channel, and mode information indicating a specific mode for displaying the allocation information. The mode information contains a display size, a display position, a display color and the like in case of the information transmission channel utilizing eyesight, for example. On the other hand, the mode information contains a volume, sound image localization, a tone and the like in case of the information transmission channel utilizing hearing. Accordingly, each of the information transmission channels is adjustable in accordance with the details of the adjustment information.

The adjustment information is set based on utilization of knowledge obtained through studies in the fields of cognitive psychology and cognitive science (relation of emotion to multisensory integration). Specific knowledge currently established includes decrease in sensitivities of eyesight, hearing, and smell as a result of depression, increase in hearing noise distraction to a process as a result of sadness, control by senses over attention itself as a basis for feeling, perception, and cognition, and other knowledge.

Based on utilization of this knowledge, each of the user statuses S1 through Sm is so defined as to represent corresponding emotional status and attentional status of the user. In this case, each of the weightings is so determined as to lower the degree of importance of the information transmission channel using an inhibitively affected sense, and to raise the degree of importance of the other information transmission channels in accordance with the user status. In addition, the allocation information and the adjustment information are so determined as to increase an information transmission volume of the information transmission channel of a high degree of importance, and allocate partial information of a high degree of importance to the corresponding information transmission channel. The allocation information and the adjustment information are so determined as to decrease an information transmission volume of the information transmission channel of a low degree of importance, and allocate partial information of a low degree of importance to the corresponding information transmission channel. In case of a configuration including multiple the information transmission channels utilizing the same sense, the information transmission channel to be used may be switched in accordance with the user status, or the information transmission channels utilizing the same sense may be simultaneously used. In this case, determination is made such that the volume and quality of information to be provided to the user (that is, content itself) do not greatly vary in accordance with the user status.

The transmission adjustment portion 5 includes a CPU 51, a ROM 52, and a RAM 53, and performs integrated control for the multisensory interface system 1 under a program stored in the ROM 52 or other storing medium and executed by the CPU 51.

Process

Figure 3:
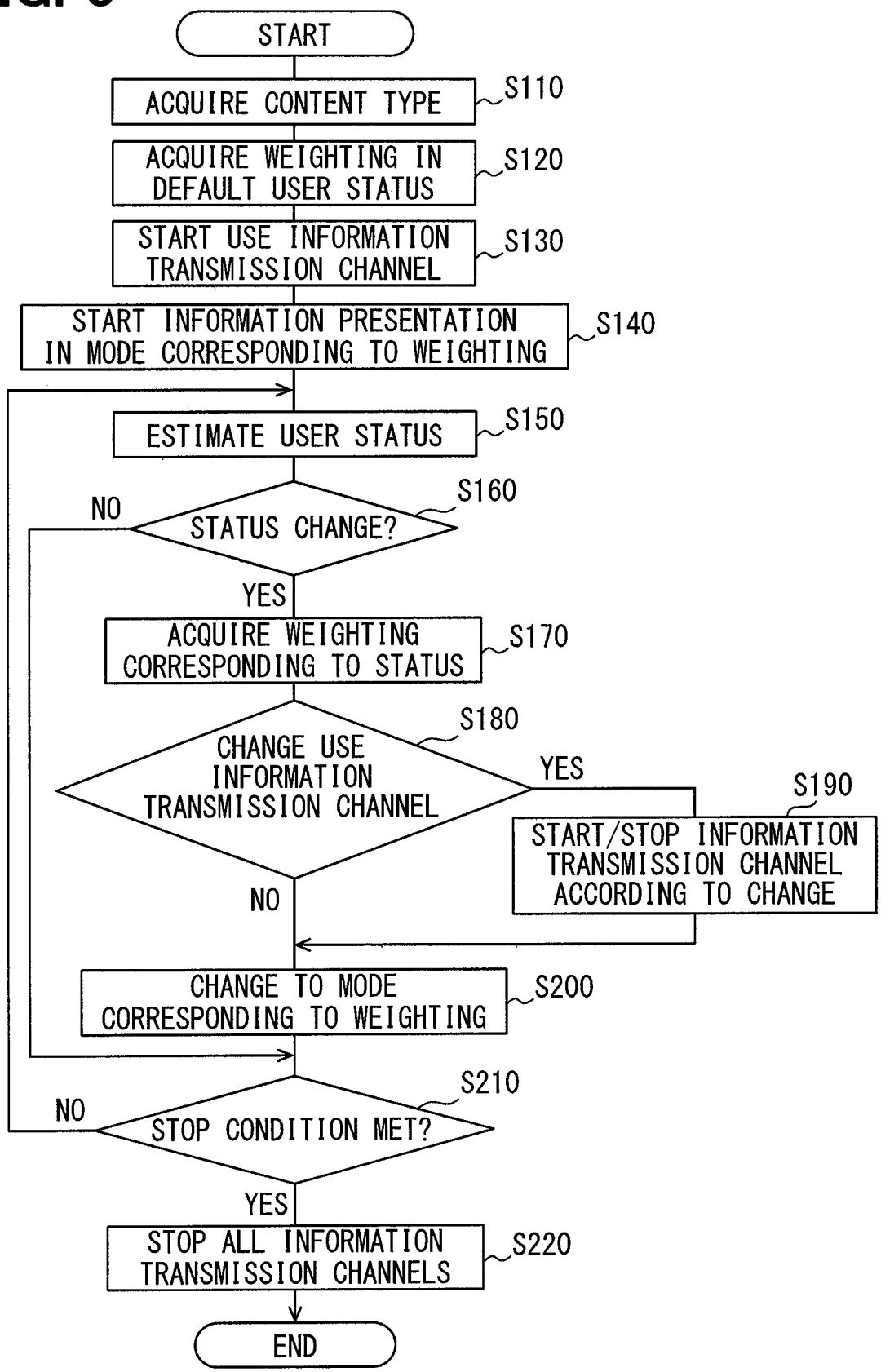
FIG. 3 is a flowchart showing details of an interface control.

A transmission adjustment process executed by the transmission adjustment portion 5 is hereinafter described with reference to a flowchart shown in FIG. 3. The process starts every time the content X is generated by the transmission information generation portion 2.

With a start of the process, the CPU 51 initially acquires information about a type of the generated content X in S110, and subsequently acquires the weightings G11 through G1$n$ of the default user status S1 from the adjustment information storage portion 4 in S120.

In a subsequent step of S130, the information transmission channel CHj corresponding to the weighting G1$j$ (j=1 to n) of a value other than zero is started based on the acquired weighting G1$j$.

In a subsequent step of S140, content adjustment details of the respective information transmission channels CH1 through CHn are acquired from the adjustment information storage portion 4 in accordance with the type of the content X and the weightings G11 through G1$n$ to start information transmission in accordance with the acquired content adjustment details. More specifically, information on partial content indicated by the allocation information for the corresponding weighting G1$j$ of the corresponding information transmission channel CHj is transmitted in the mode indicated by the mode information with reference to FIG. 2B.

In a subsequent step of S150, the user status Si is estimated based on a measurement result acquired from the user status measurement portion 3. In a subsequent step of S160, it is determined whether or not the user status Si has changed from a previous status. The process shifts to S170 when it is determined that the user status Si has changed, or shifts to S210 when it is determined that the user status Si has not changed.

In S170, the weightings Gi1 through Gin corresponding to the user status Si estimated in S150 are acquired from the adjustment information storage portion 4. In a subsequent step of S180, it is determined whether or not the information transmission channels CH1 through CHn to be used have changed based on the acquired weightings Gi1 through Gin.

When it is determined that the information transmission channels CH1 through CHn to be used have changed (S180: YES), the corresponding information transmission channels CH1 through CHn are started or stopped in accordance with the change in S190. Thereafter, the process proceeds to S200. On the other hand, when it is determined the information transmission channels CH1 through CHn have not changed (S180: NO), the process proceeds to S200 while skipping S190.

In S200, content adjustment details of the respective information transmission channels CH1 through CHn are acquired from the adjustment information storage portion 4 in accordance with the weightings Gi1 through Gin acquired in S170. In this step, the allocations and transmission modes of respective sets of the partial content I1 through Ix to be transmitted via the respective information transmission channels CH1 through CHn are changed in accordance with the acquired content adjustment details. Thereafter, the process proceeds to S210.

In S210, it is determined whether or not a stop condition set beforehand has been met for the content X corresponding to information currently transmitted. When it is determined that the stop condition has not been met (S210: NO), the process returns to S150 to repeat the foregoing processing from S150 to S200. On the other hand, when it is determined that the stop condition has been met (S210: YES), the process proceeds to S220 to stop all the information transmission channels, and ends the process.

Operation

Figure 4A:
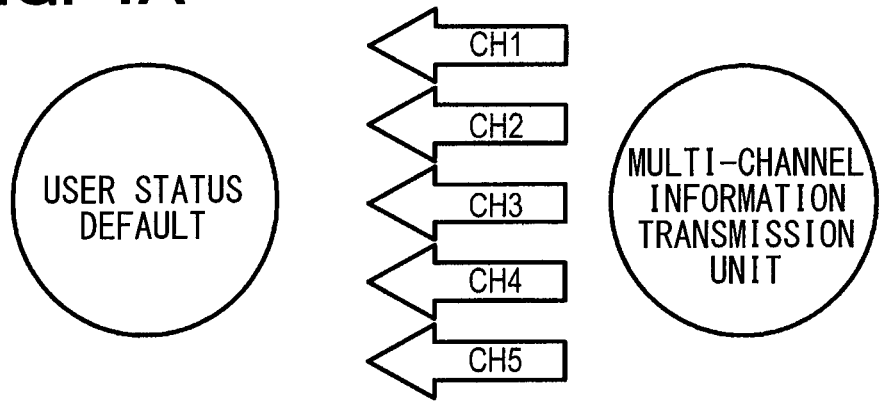
FIG. 4A is an explanatory view illustrating changes of degrees of importance of information transmission channels.

In the default user status as illustrated in FIG. 4A, for example, all the information transmission channels are set to the same degree of importance. Alternatively, a different degree of importance may be set for each of the information transmission channels in the default user status in accordance with characteristics of information. In addition, all the information transmission channels are not required to start in the default user status. A part of the information transmission channels may be configured to start only in a particular user status for supplementary use.

Figure 4B:
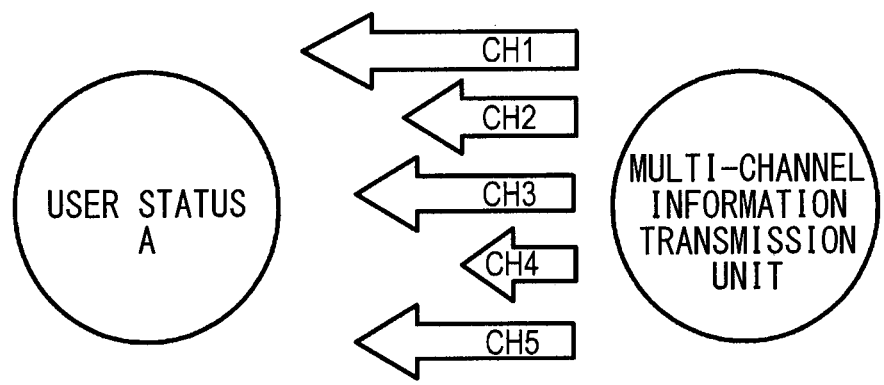
FIG. 4B is an explanatory view illustrating changes of degrees of importance of the information transmission channels.
Figure 4C:
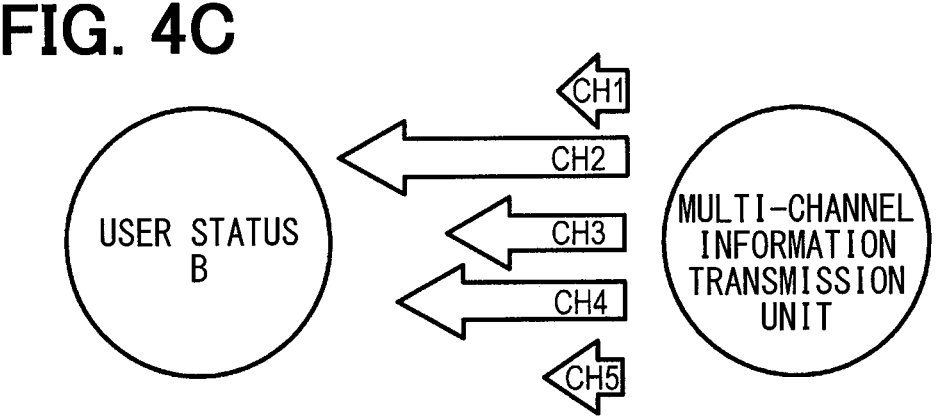
FIG. 4C is an explanatory view illustrating changes of degrees of importance of the information transmission channels.

As illustrated in FIG. 4B and FIG. 4C, the information transmission channels utilizing senses expected to achieve efficient information transmission are more positively used (weightings are raised) in accordance with the user status, while the use of the information transmission channels utilizing senses not expected to achieve efficient information transmission is reduced (weightings are lowered) in accordance with the user status.

Each of the figures illustrates a case when all the information transmission channels are used. However, selective use of only a part of the information transmission channels is allowed in accordance with the user status.

Effects

Figure 19A:
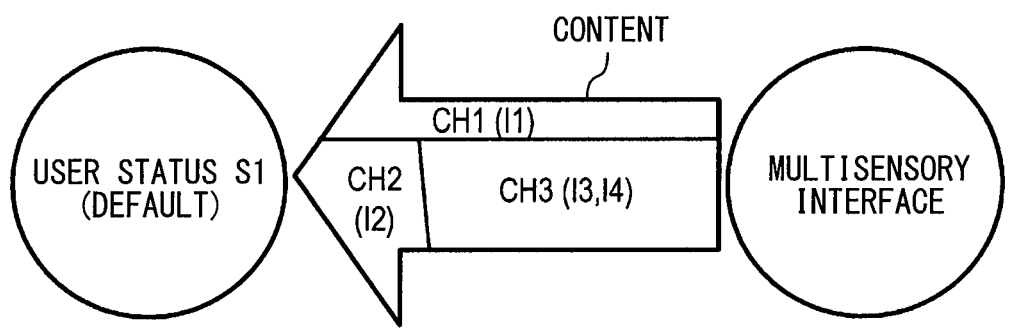
FIG. 19A is a conceptual diagram illustrating a concept of allocation of partial content to respective information transmission channels.
Figure 19B:
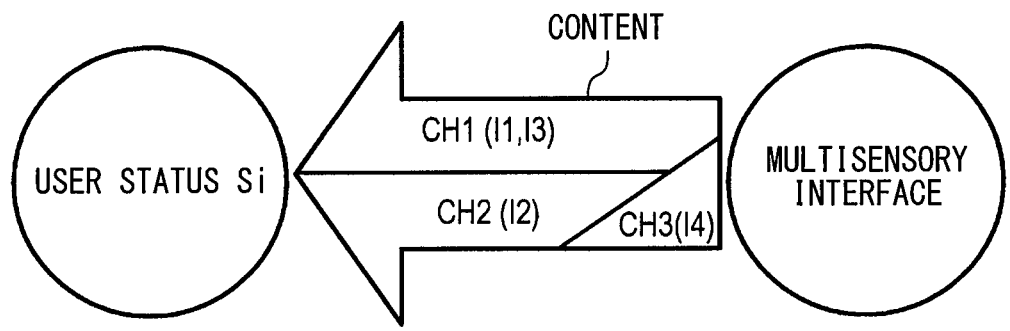
FIG. 19B is a conceptual diagram illustrating a concept of allocation of partial content to respective information transmission channels.

According to the multisensory interface system 1 described above, the information transmission channels to which a high degree of importance is given are switched in accordance with the user status. In this case, the allocations and transmission modes of respective sets of the partial content to the information transmission channels CH1 through CHn are appropriately changed in accordance with the weighting Gij indicating a degree of importance. More specifically, as illustrated in FIG. 19A and FIG. 19B, the information transmission channels CH1 through CHn used to transmit respective sets of the partial content I1 through Ix are appropriately changed in accordance with the user status. However, in view of the overall information transmission channels CH1 through CHn, the sets of the necessary partial content I1 through Ix are transmitted without any omissions. Accordingly, effective information transmission is realizable without an unnecessary loss of information.

Furthermore, information transmission via the information transmission channels not expected to achieve efficient information transmission is reduced. Accordingly, it is possible to reduce a burden imposed on the user at the time of reception of information.

First Application Example

Discussed herein is an example of the multisensory interface system 1 applied to a drive assistance system for a driver driving a vehicle.

Information transmission channels included in the present example are the first eyesight channel (CH1) configured by a display device for displaying navigation information, the hearing channel (CH2) configured by an acoustic device for providing voice guidance or the like, the touch channel (CH3) configured by a vibration device provided on a steering wheel, and the second eyesight channel (CH4) configured by a head-up display for displaying various types of information.

Figure 5:
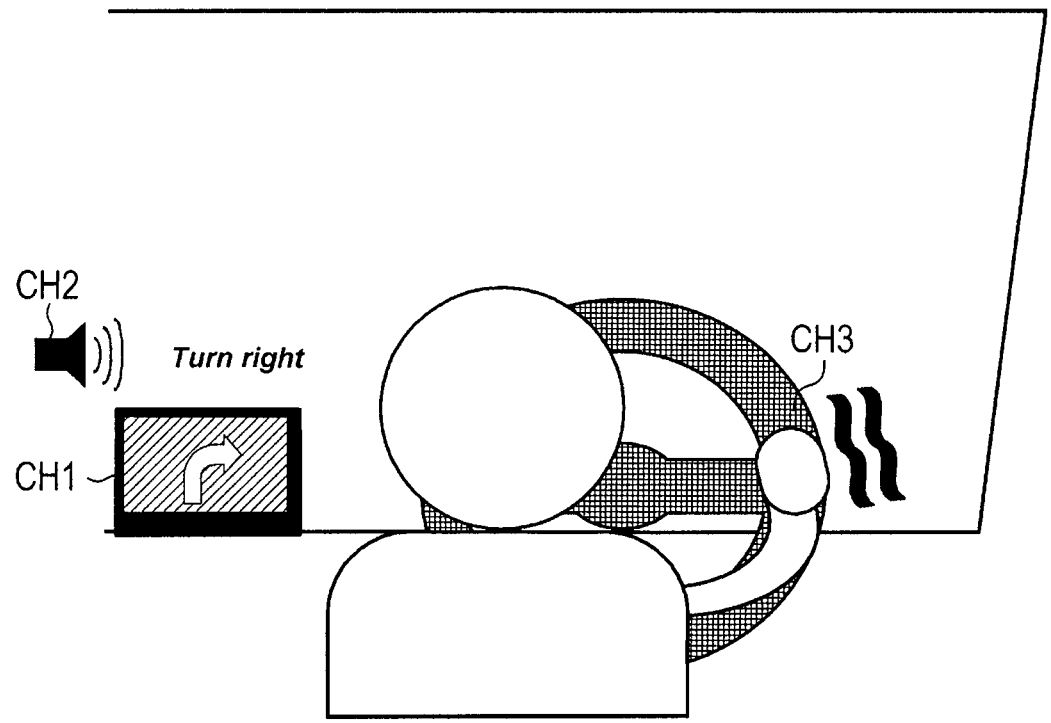
FIG. 5 is an explanatory view illustrating states of information transmission channels in a default user status in a first application example (applied to a drive assistance system)
Figure 6:
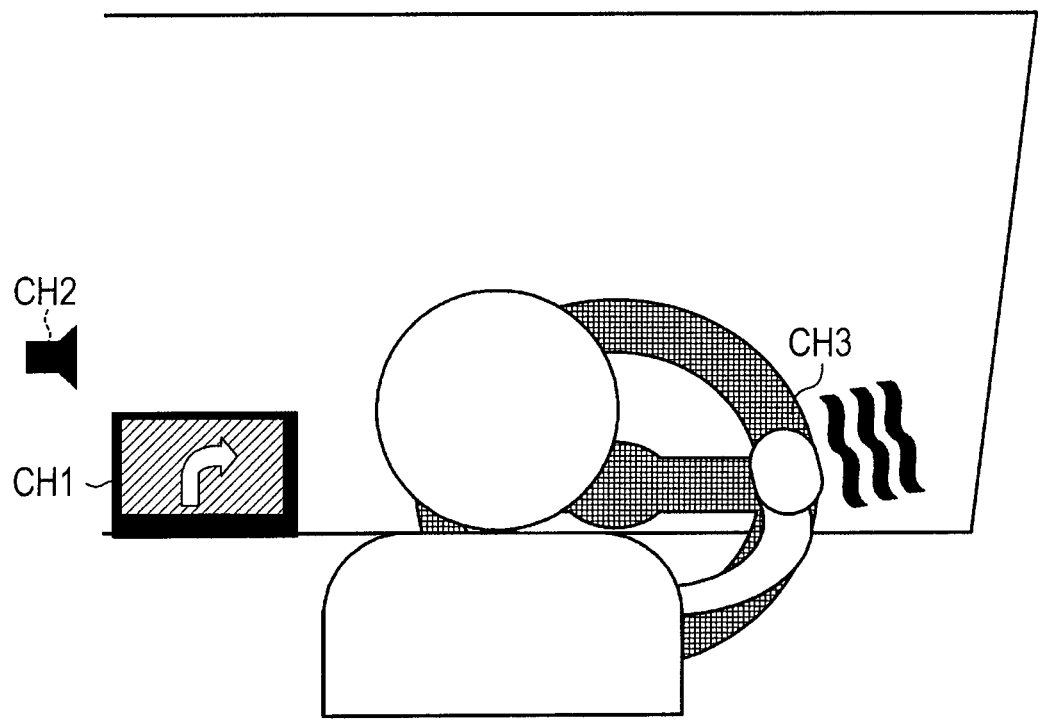
FIG. 6 is an explanatory view illustrating states of the information transmission channels at the time of a change of the user status in the first application example.
Figure 7:
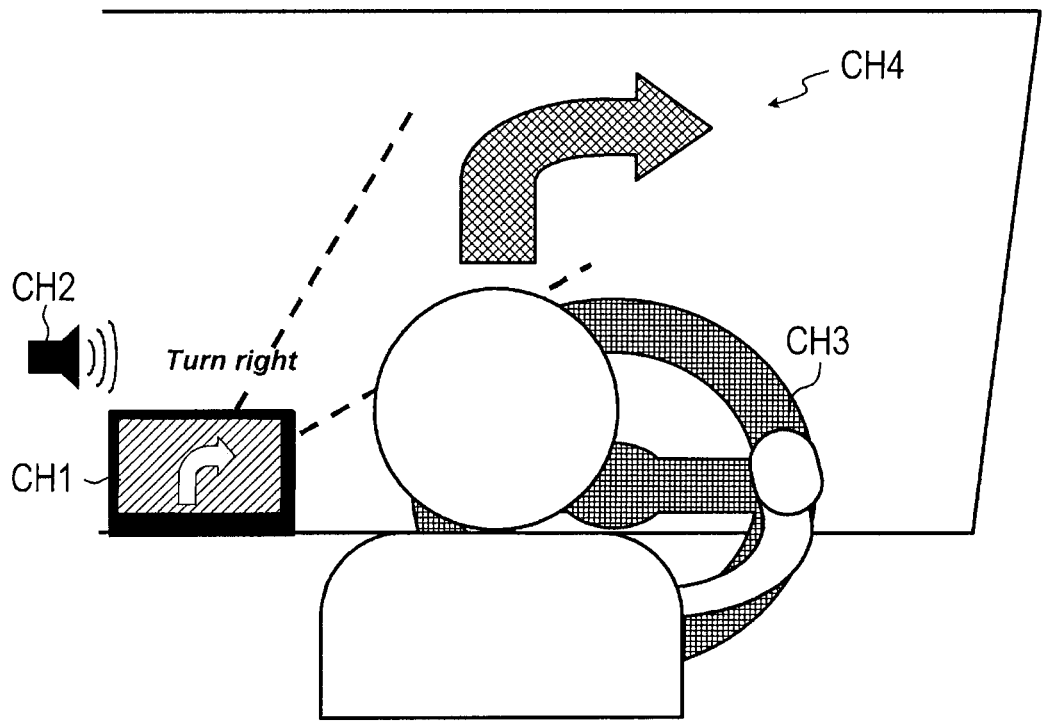
FIG. 7 is an explanatory view illustrating other states of the information transmission channels at the time of a change of the user status in the first application example.

In the default user status, information (content) for driving assistance is presented to the driver by using the CH1, CH2, and CH3 as illustrated in FIG. 5. The figure shows a case of right turn navigation. When the user status changes to a status difficult to efficiently transmit information via voices, such as a case when the driver concentrates on something, the hearing channel CH2 is stopped as illustrated in FIG. 6. In this case, an information transmission level of the touch channel CH3 is simultaneously raised. When the attentional status of the driver is distracted, information transmission utilizing eyesight is emphasized by the use of the second eyesight channel CH4 (a head-up display) as well as the first eyesight channel CH1 (a normal screen) as illustrated in FIG. 7. In this case, the information transmission channel not requiring a high degree of importance (the touch channel CH3 in the present example) may be stopped, for example.

Second Application Example

Discussed herein is an example which uses a display panel, such as a speedometer, as the first eyesight channel CH1 in the drive assistance system shown in the first application example.

Figure 8:
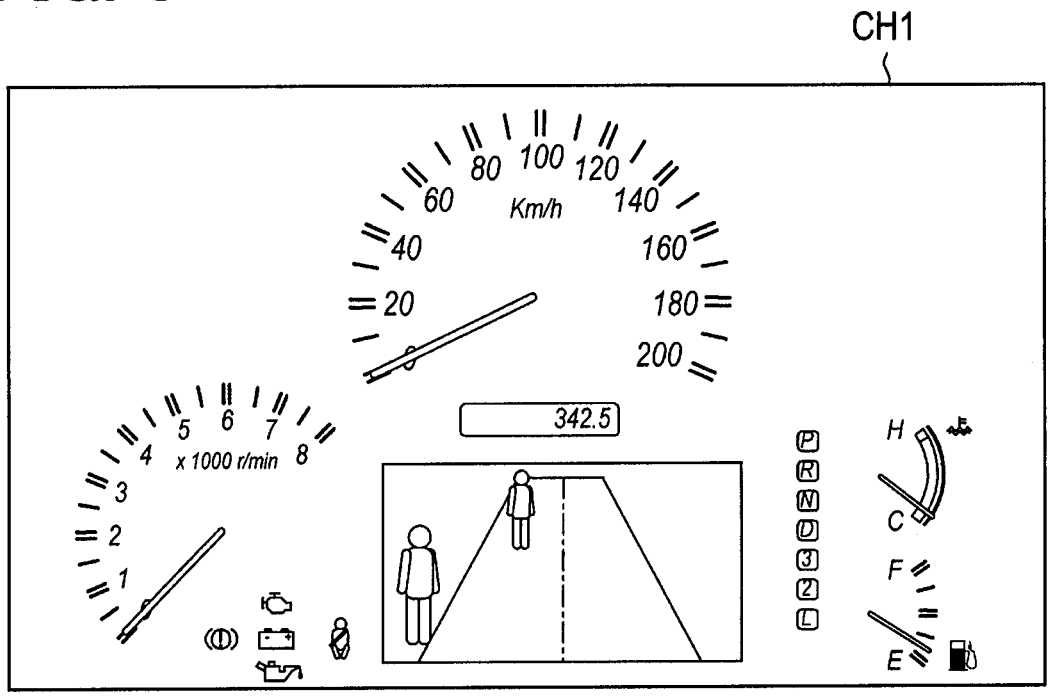
FIG. 8 is an explanatory view illustrating a display state of an eyesight channel in a default user status in a second application example (applied to a display panel of a vehicle)
Figure 9:
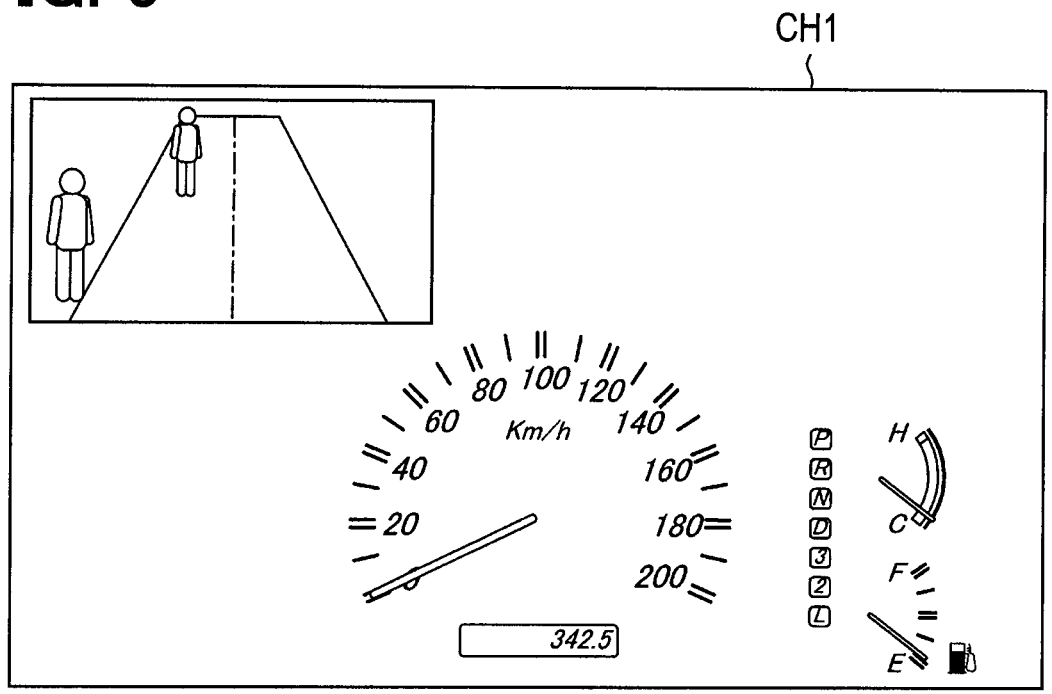
FIG. 9 is an explanatory view illustrating a display state of the eyesight channel at the time of a change of a user status in the second application example.

As illustrated in FIG. 8, a display panel primarily displays a lot of sets of partial content such as a speedometer, a tachometer, a cooling water temperature meter, a fuel meter, and icons indicating various vehicle states. The display panel further displays image information corresponding to partial content for driving assistance, i.e., an image showing the presence of a pedestrian before the vehicle or the like in the present example. At the time of a change of the user (driver) status, it is conceivable that the partial content for driving assistance is emphasized by changing a display position, or omitting other partial content of a relatively low degree of importance as illustrated in FIG. 9, for example. In this case, information of the partial content omitted from the first eyesight channel CH1 is transmitted via other information transmission channels such as the hearing channel CH2 and the touch channel CH3 while changing the volume and quality of the omitted information, rather than only omitting the corresponding information (see FIGS. 19A and 19B). The present method allows transmission of information to the user while only changing allocations of respective sets of partial content to be transmitted via the information transmission channels even at the time of a change of the user status. In this case, no loss of information is produced.

Third Application Example

Discussed herein is an example of the multisensory interface system 1 applied to a cooking assistance system.

Information transmission channels included in the present example are the eyesight channel CH1 configured by a spectacle-type display for displaying a point of interest, and the hearing channel CH2 configured by an acoustic device for amplifying sound generated during cooking and outputting the amplified sound.

Figure 10:
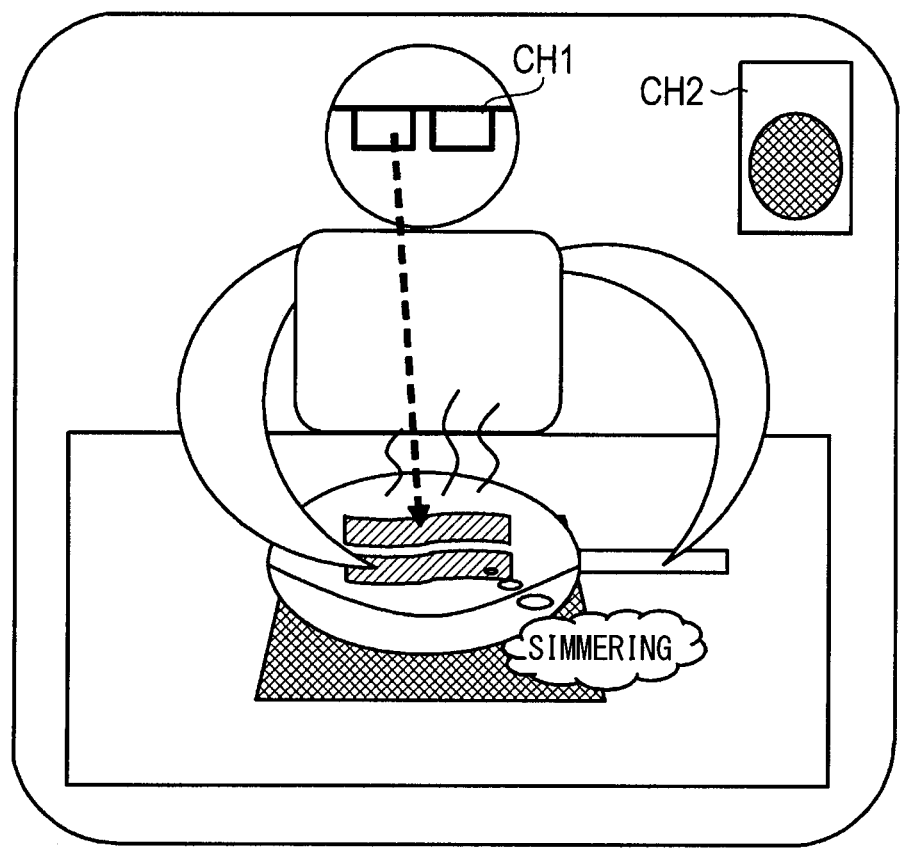
FIG. 10 is an explanatory view illustrating states of information transmission channels in a default user status in a third application example (applied to a cooking assistance system)
Figure 11:
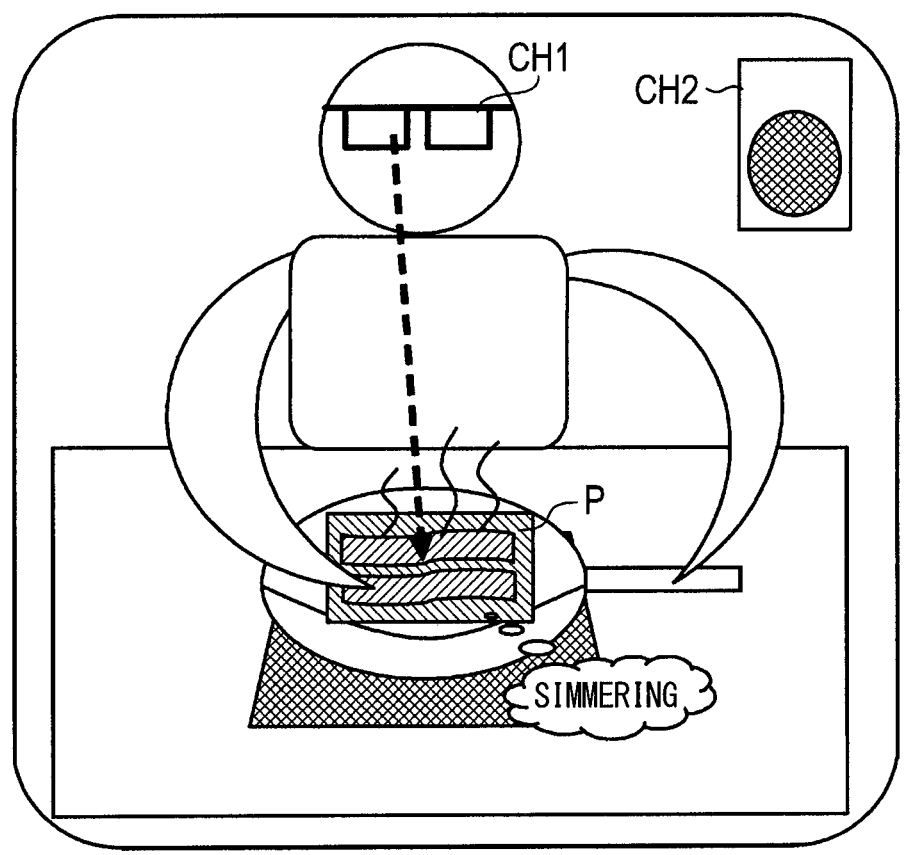
FIG. 11 is an explanatory view illustrating states of the information transmission channels at the time of a change of a user status in the third application example.
Figure 12:
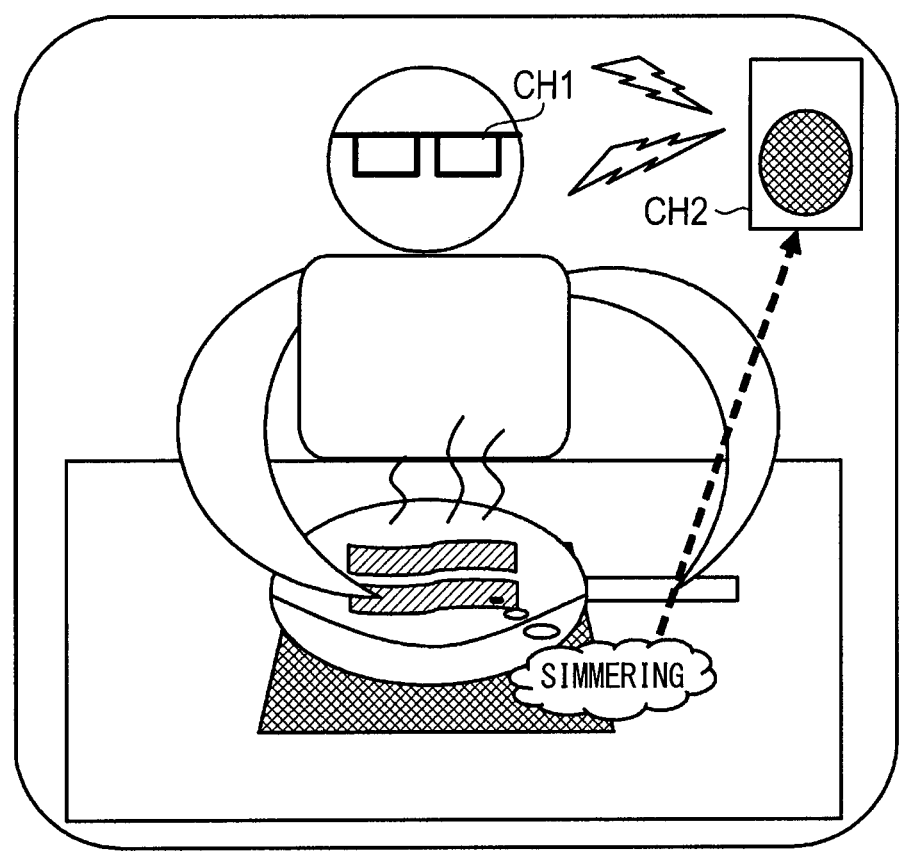
FIG. 12 is an explanatory view illustrating other states of the information transmission channels at the time of a change of the user status in the third application example.

As illustrated in FIG. 10, it is assumed that neither of the information transmission channels CH1 and CH2 is used in the default user status. When it is detected that the user status is a distracted attentional status, the eyesight channel CH1 is started to emphasize display of a point P to which attention should be paid (superimpose display indicating attention area) as illustrated in FIG. 11. When the user status subsequently changes to a status allowing most effective use of hearing, the hearing channel CH2 is started to generate sound of cooking (such as simmering sound and sizzling sound) in a easily recognizable manner as illustrated in FIG. 12. The present method prevents a failure or an accident of cooking caused by excessive heating, for example.

Fourth Application Example

Discussed herein is an example of the multisensory interface system 1 applied to telephone communication via a cellular phone such as a smartphone.

Information transmission channels included in the present example are the eyesight channel CH1 (screen), and the hearing channel CH2 (speaker). In this case, the user status is estimated based on a speech condition of the user, for example.

Figure 13:
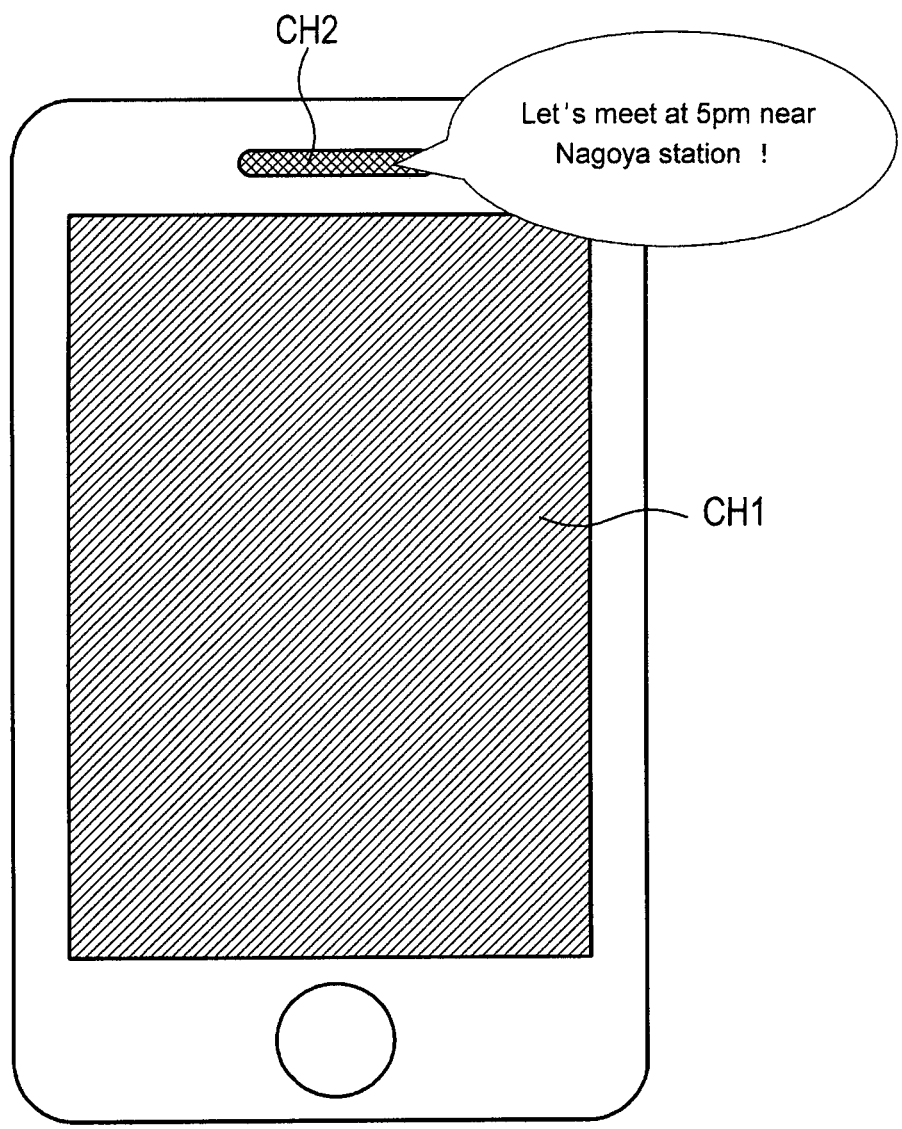
FIG. 13 is an explanatory view illustrating states of information transmission channels in a default user status in a fourth application example (applied to cellular phone such as smartphone)
Figure 14:
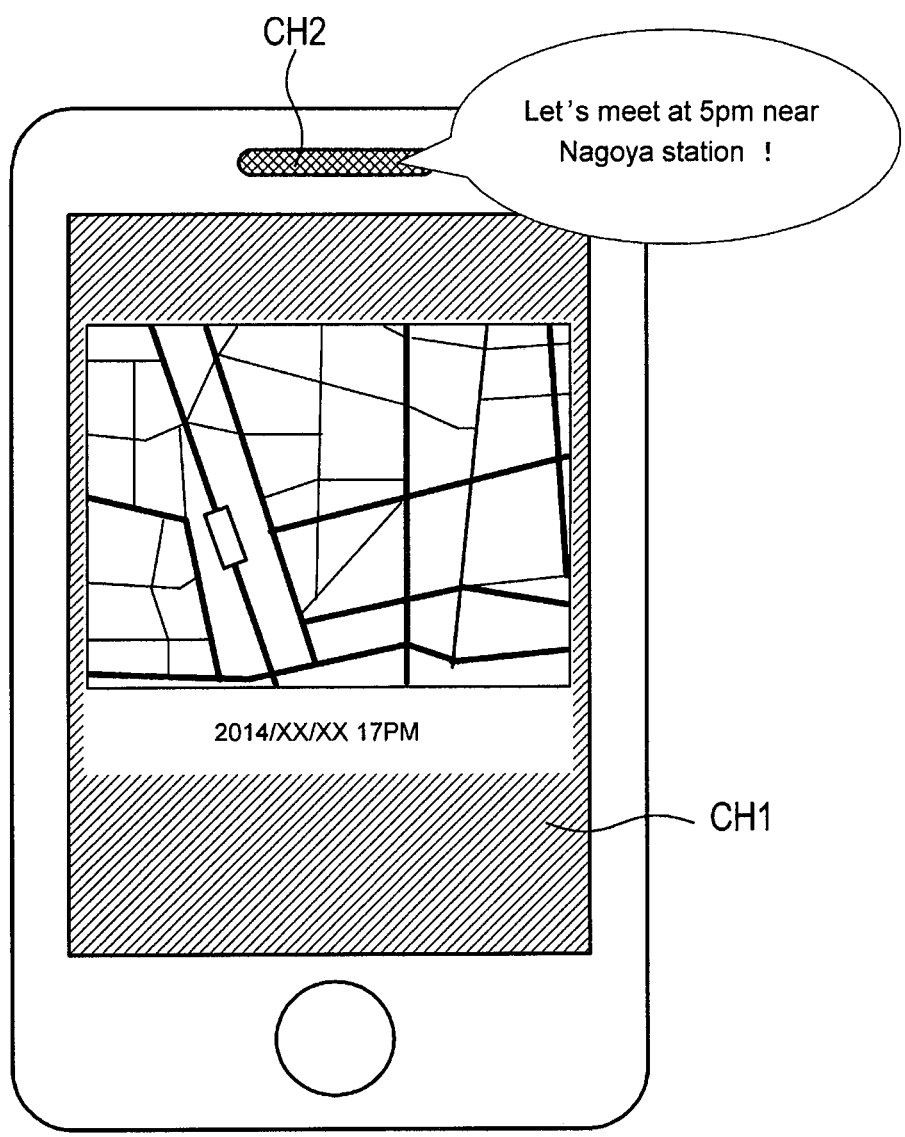
FIG. 14 is an explanatory view illustrating states of the information transmission channels at the time of a change of a user status in the fourth application example.
Figure 15:
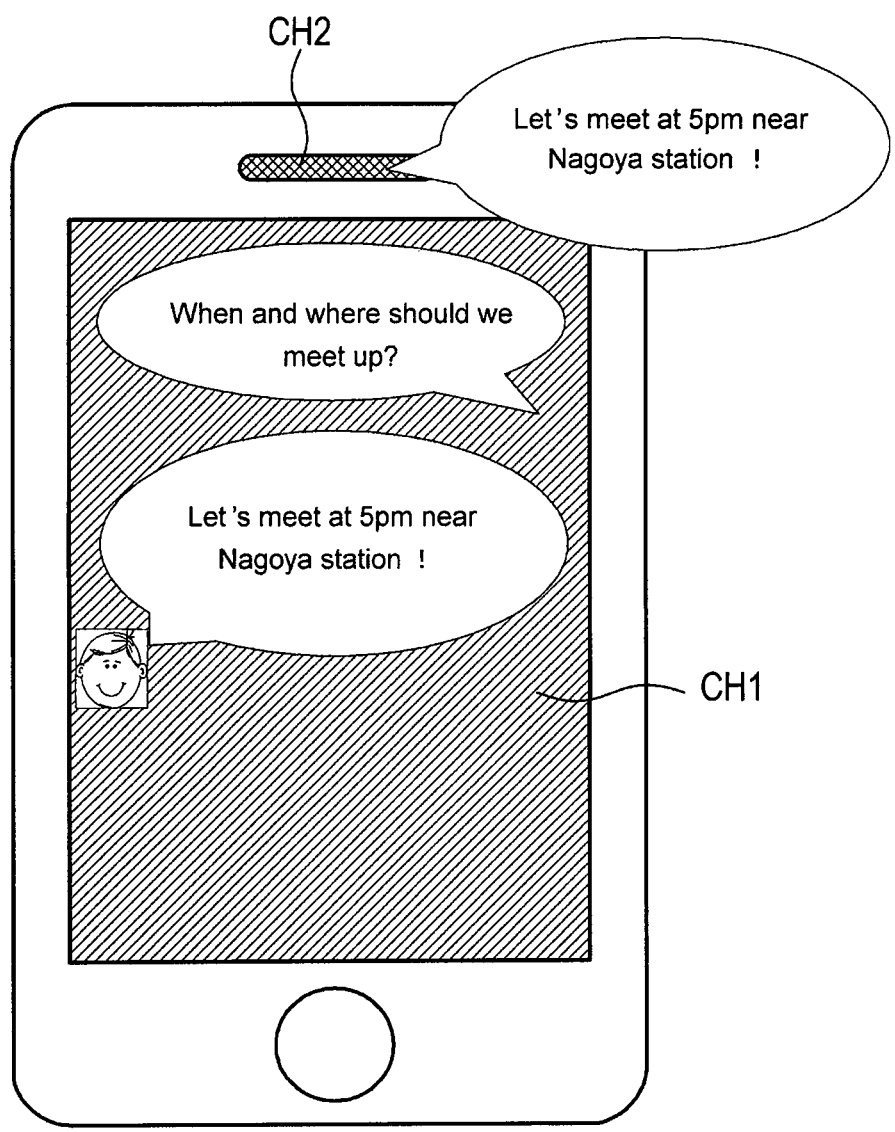
FIG. 15 is an explanatory view illustrating other states of the information transmission channels at the time of a change of the user status in the fourth application example.

In the default user state, communication is performed only by using the hearing channel CH2 as illustrated in FIG. 13. When it is detected that the user status is a status difficult to accurately transmit important information (such as place and time of discussion) only by transmission of hearing information due to an emotional change of the user such as irritation, the eyesight channel CH1 is started to display a map indicating a place recognized based on voices during telephone communication as illustrated in FIG. 14. Alternatively, conversation contents recognized based on voices during telephone communication, or a place or a time extracted from the conversation contents are displayed in characters as illustrated in FIG. 15. The present method securely transmits important information by appropriately starting the eyesight channel CH1 in accordance with the user status as a supplement for the hearing channel CH2.

Fifth Application Example

Discussed herein is an example of the multisensory interface system 1 applied to an application (app) executed by a cellular phone such as a smartphone, particularly to a sleep app provided as one of well-being associated applications in the present example.

Information transmission channels included in the present example are the eyesight channel CH1 (screen), the hearing channel CH2 (speaker), the first touch channel CH3 (vibrator), and the second touch channel CH4 (heater). In this case, the user status is estimated based on breathing or heart sound, for example.

Figure 16:
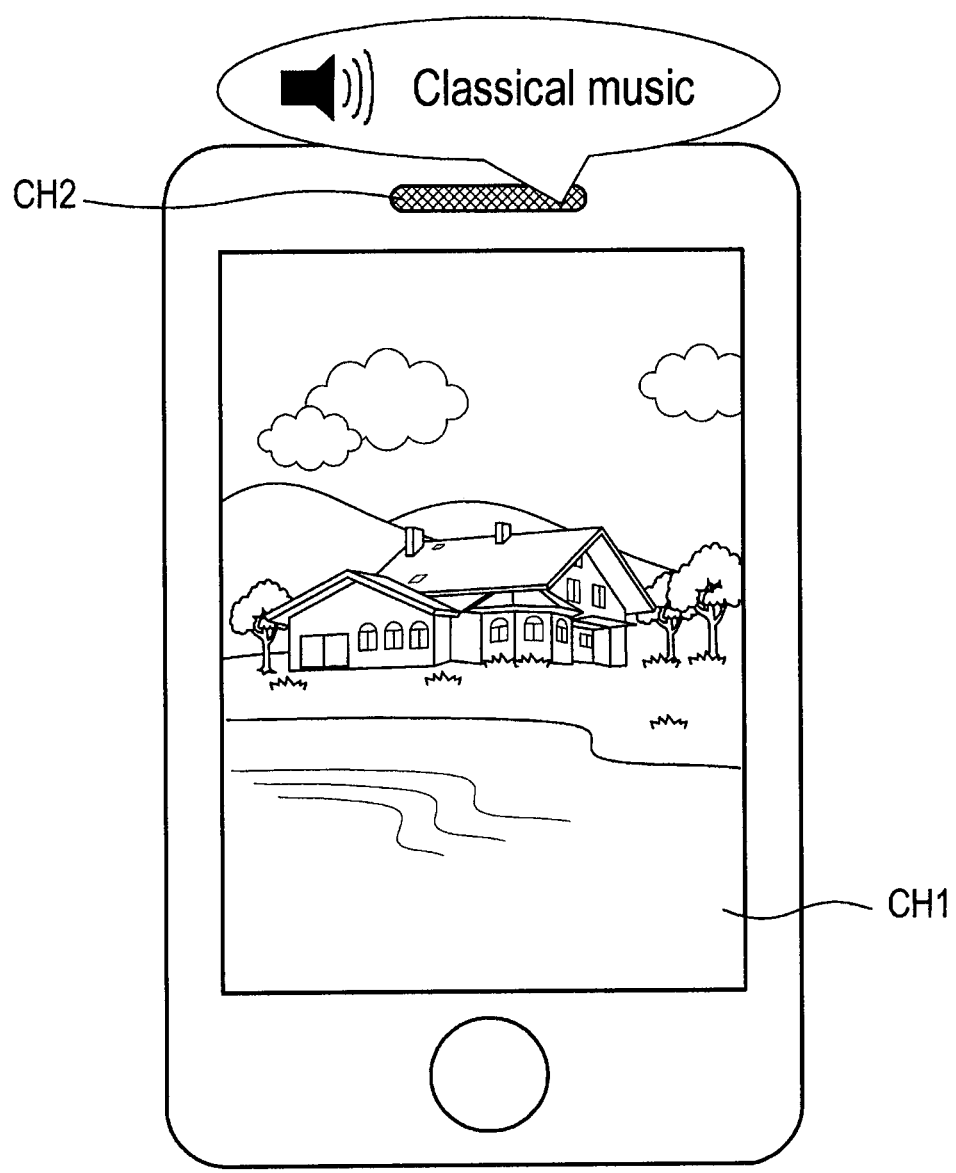
FIG. 16 is an explanatory view illustrating states of information transmission channels in a default user status in a fifth application example (applied to an application executed by a cellular phone)
Figure 17:
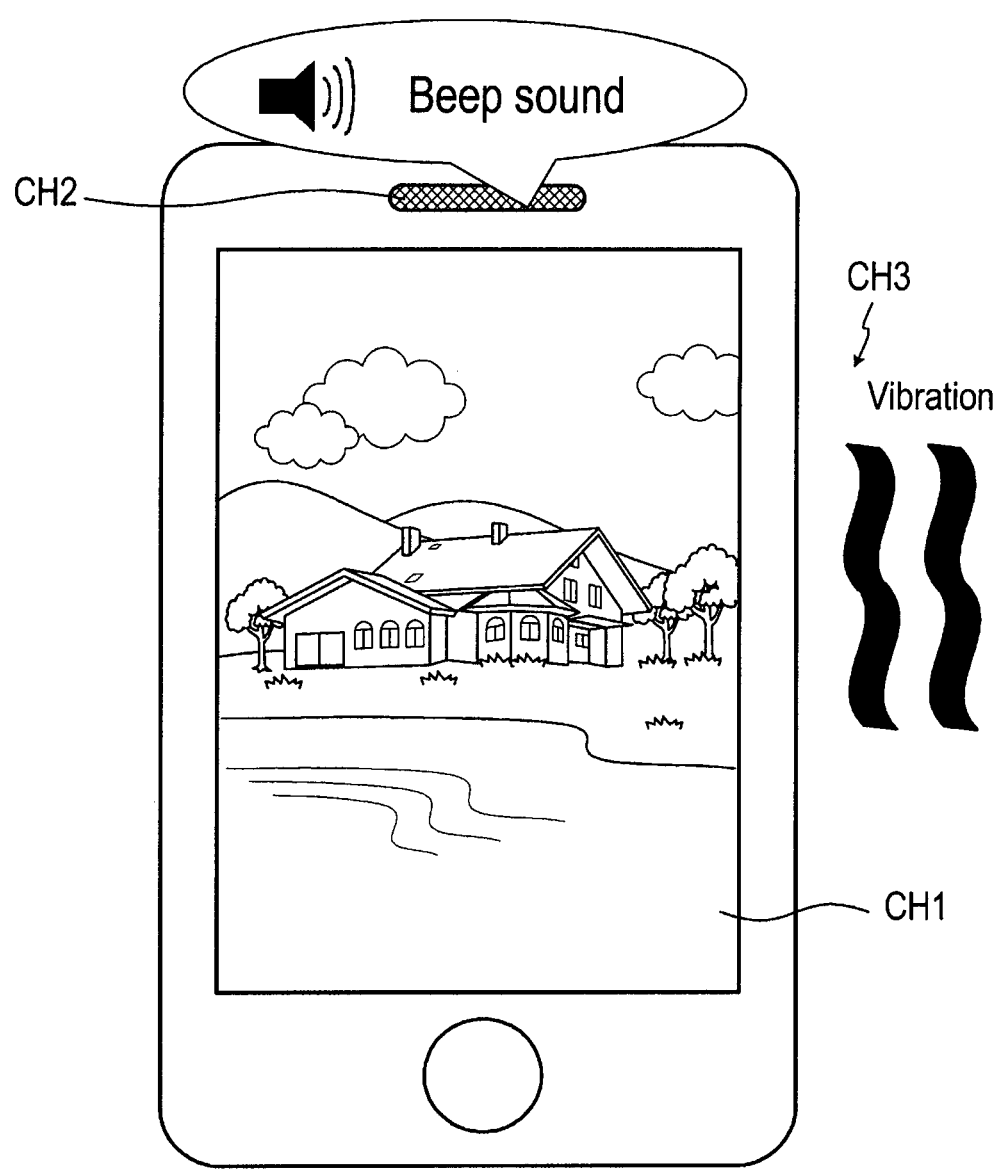
FIG. 17 is an explanatory view illustrating states of the information transmission channels at the time of a change of a user status in the fifth application example.
Figure 18:
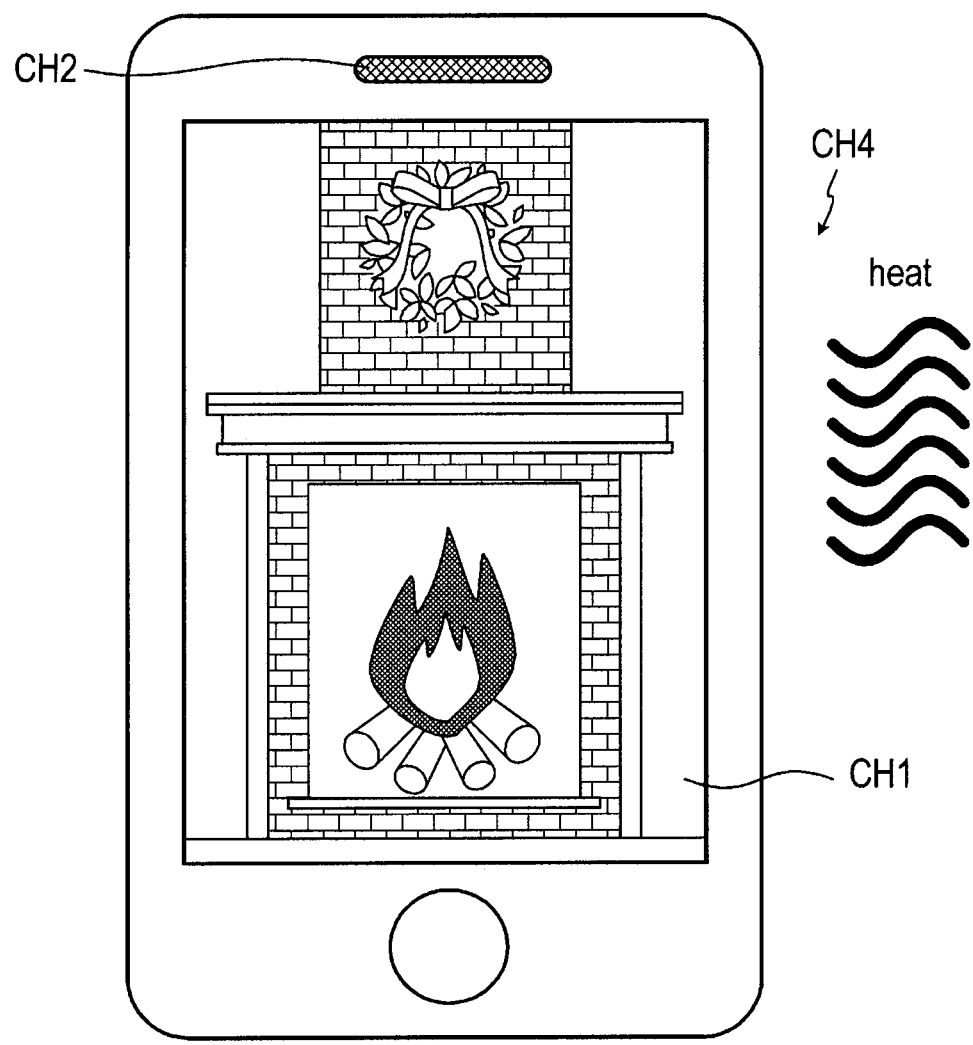
FIG. 18 is an explanatory view illustrating other states of the information transmission channels at the time of a change of the user status in the fifth application example.

In an initial status immediately after a start of the app (default status), an image or music evoking a fresh feeling is output by using the eyesight channel CH1 and the hearing channel CH2 as illustrated in FIG. 16. When the default sense presentation is not effective in a status other than the default status, the music output from the hearing channel CH2 is switched from music to a monotonous sound effect as illustrated in FIG. 17. In this case, the first touch channel CH3 is simultaneously started to give regular vibrational stimulation to the user. Alternatively, in a status different from the foregoing status other than the default status, output of the eyesight channel is switched to an image evoking a warm feeling as illustrated in FIG. 18. In this case, the second touch channel CH4 is simultaneously started to give warming stimulation to the user and bring the user into a relaxed state.

Other Embodiments

While an embodiment according to the present disclosure has been described herein, the present disclosure may be practiced in various modes other than the present embodiment.

A function performed by one constituent element in the embodiment may be divided into multiple functions performed by multiple constituent elements, or functions performed by multiple constituent elements may be unified into a function performed by one constituent element. Moreover, a part of configurations of the embodiment may be omitted. Furthermore, at least a part of configurations of the embodiment may be added to or substituted for other configurations of the embodiment, for example.

The present disclosure may be realized in various forms other than the multisensory interface system 1, the multisensory interface control apparatus (transmission adjustment portion 5), and the multisensory interface control method (process performed by transmission adjustment portion 5) described above, such as a system including constituent elements of the multisensory interface system and the multisensory interface control apparatus described above, a program under which a computer performs the function of the multisensory interface control apparatus described above, a medium recording the program, and others.

The technical scope of the present disclosure is not limited to the contents described in the embodiment.

It is noted that a flowchart or the processing of the flowchart in the present application includes multiple steps (also referred to as sections), each of which is represented, for instance, as S110. Further, each step can be divided into several sub-steps while several steps can be combined into a single step.

While various embodiments, configurations, and aspects of multisensory interface control method, multisensory interface control apparatus, and multisensory interface system have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A multisensory interface control method for a multisensory interface that includes a plurality of information transmission channels, each of which performing information transmission by utilizing at least two of a plurality of five senses, the multisensory interface control method comprising:
estimating a user status indicating at least one of an emotional status and an attentional status of a driver who is driving a vehicle;
setting weightings, each of which indicates a degree of importance of a corresponding information transmission channel in accordance with the user status estimated, wherein a degree of importance of at least one information transmission channel using an inhibitively affected sense is lowered, a degree of importance of at least one information transmission channel other than the information transmission channel using the inhibitively affected sense is raised; and changing allocations of a plurality of sets of partial content that configure content transmitted via the multisensory interface, the allocations being changed in accordance with the weightings, wherein:

the multisensory interface control method is implemented in a drive assistance system for the driver;

the at least one information transmission channel using an inhibitively affected sense performs the information transmission via a first sense of the five senses; and the at least one information transmission channel other than the information transmission channel using the inhibitively affected sense performs the information transmission via a second sense of the five senses.

2. A multisensory interface control apparatus that controls a multisensory interface that includes a plurality of information transmission channels, each of which performing information transmission by utilizing at least two of a plurality of five senses, the multisensory interface control apparatus comprising:

a user status estimation portion that estimates a user status indicating at least one of an emotional status and an attentional status of a driver who is driving a vehicle;

a weighting setting portion that sets weightings, each of which indicates a degree of importance of a corresponding information transmission channel in accordance with the user status estimated by the user status estimation portion, wherein a degree of importance of at least one information transmission channel using an inhibitively affected sense is lowered, a degree of importance of at least one information transmission channel other than the information transmission channel using the inhibitively affected sense is raised; and a content adjustment portion that changes allocations of a plurality of sets of partial content that configure content transmitted via the multisensory interface, the allocations being changed in accordance with the weightings, wherein:

the multisensory interface control apparatus is implemented in a drive assistance system for the driver;

the at least one information transmission channel using an inhibitively affected sense performs the information transmission via a first sense of the five senses; and the at least one information transmission channel other than the information transmission channel using the inhibitively affected sense performs the information transmission via a second sense of the five senses.

3. The multisensory interface control apparatus according to claim 2, wherein:

the weightings are set in accordance with a correlation between sensitivities of the five senses of the user and at least one of the emotional status and the attentional status of the user.

4. The multisensory interface control apparatus according to claim 2, wherein:

the user status estimation portion estimates the user status based on at least one of an expression of the user and a biosignal of the user.

5. A multisensory interface system comprising:

a multisensory interface that includes a plurality of information transmission channels each of which performs information transmission by utilizing at least one of a plurality of five senses; and the multisensory interface control apparatus according to claim 2.

6. The multisensory interface control apparatus according to claim 2, wherein:

in accordance with the weightings set by the weighting setting portion, the content adjustment portion changes the allocations of the plurality of sets of partial content, causing an information transmission volume of the information transmission channel having a high degree of importance to be increased, and the information transmission volume of the information transmission channel having a low degree of importance to be decreased.

7. The multisensory interface control apparatus according to claim 2, wherein:

in accordance with the weightings set by the weighting setting portion, the content adjustment portion allocates a partial content having a high degree of importance to an information transmission channel having a high degree of importance, and allocates a partial content having a low degree of importance to an information transmission channel having a low degree of importance;

a degree of importance including the high degree and the low degree of importance is determined whether an inhibitively affected sense according to the user status is used or not, the user status being defined to show an emotional status and attentional status of the driver.

8. The multisensory interface control apparatus according to claim 2, wherein:

the inhibitively affected sense is a sense of which a sensitivity is lowered in accordance with the user status.

9. A multisensory interface control apparatus that controls a multisensory interface that includes a plurality of information transmission channels, each of which performing information transmission by utilizing at least two of a plurality of five senses, the multisensory interface control apparatus comprising:

a user status estimation portion that estimates a user status indicating an emotional status of a driver who is driving a vehicle;

a weighting setting portion that sets weightings, each of which indicates a degree of importance of a corresponding information transmission channel in accordance with the user status estimated by the user status estimation portion, wherein a degree of importance of at least one information transmission channel using an inhibitively affected sense is lowered, a degree of importance of at least one information transmission channel other than the information transmission channel using the inhibitively affected sense is raised; and a content adjustment portion that changes allocations of a plurality of sets of partial content that configure content transmitted via the multisensory interface, the allocations being changed in accordance with the weightings, wherein:

the multisensory interface control apparatus is implemented in a drive assistance system for the driver;

the at least one information transmission channel using an inhibitively affected sense performs the information transmission via a first sense of the five senses; and the at least one information transmission channel other than the information transmission channel using the inhibitively affected sense performs the information transmission via a second sense of the five senses.

* * * * *